United States Patent

[11] 3,625,992

[72] Inventors Dieter Duerr
Bottmingen;
Ladislaus Pinter, Basel, both of Switzerland
[21] Appl. No. 686,342
[22] Filed Nov. 28, 1967
[45] Patented Dec. 7, 1971
[73] Assignee Ciba Limited
Basel, Switzerland
[32] Priority Dec. 1, 1966
[33] Switzerland
[31] 17181/66

[54] N-METHYL PHENYL CARBAMATES
2 Claims, No Drawings
[52] U.S. Cl....................................................... 260/479,
71/72, 71/88, 71/92, 71/94, 71/95, 71/98, 71/99,
424/246, 424/248, 424/250, 424/267, 424/274,
424/300, 260/239, 260/243, 260/247.1, 260/268,
260/293.4, 260/326.3, 260/454, 260/463,
260/465, 260/470, 260/472, 260/552, 260/566
[51] Int. Cl........................................................C07c 157/14
[50] Field of Search........................................... 260/479 C

[56] References Cited
UNITED STATES PATENTS
2,776,197 1/1957 Gysin ............................ 260/479
3,434,822 2/1965 Wilson ......................... 260/479
FOREIGN PATENTS
932,064 8/1955 Germany...................... 260/479

Primary Examiner—James A. Patten
Attorneys—Harry Goldsmith, Joseph G. Kolodny and Bryant W. Brennan ABSTRACT: The present invention relates to carbamates of the general formula

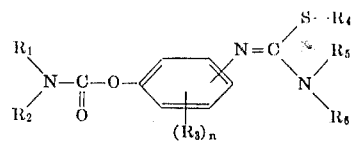
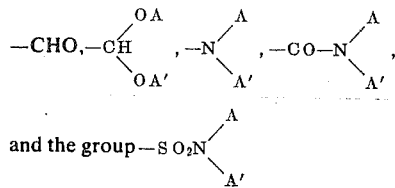

in which $R_1$ is a substituent selected from the group consisting of hydrogen and an aliphatic radical, $R_2$ represents a substituent selected from the group consisting of an aliphatic, an araliphatic and an aromatic radical, $R_3$ is a substituent selected from the class consisting of a halogen atom, a lower alkyl, a lower alkoxy, a lower alkylthio, a lower alkylsulfinyl, a lower alkylsulfonyl radical, the group $-NO_2$, $-CN$, $-SCN$, $$-CHO, -CH\begin{matrix}OA\\OA'\end{matrix}, -N\begin{matrix}A\\A'\end{matrix}, -CO-N\begin{matrix}A\\A'\end{matrix},$$

and the group $-SO_2N\begin{matrix}A\\A'\end{matrix}$ (in which A and A' are identical or different and each represents a hydrogen atom or a lower alkyl radical and/or a carbalkoxy group), $n$ represents an integer selected from 0, 1 and 2, $R_4$ represents a substituent selected from the class consisting of a hydrogen atom, an aliphatic and an araliphatic radical, $R_5$ represents a substituent selected from the class consisting of a hydrogen atom, an aliphatic and an aromatic radical, $R_6$ represents a substituent selected from the class consisting of a hydrogen atom, an aliphatic radical, an aliphatic radical linked with the nitrogen atom through oxygen, with the proviso that when $R_4$ represents a hydrogen atom, the phenolic group must be in $p$-position relatively to the nitrogen-containing group as well as to pesticidal preparations containing, as active ingredients, such carbamates as defined above.

N-METHYL PHENYL CARBAMATES

The present invention provides new pest control prepations, which comprise, as active constituent, at least one carbamate of the general formula

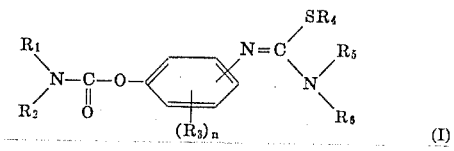

in which $R_1$ represents hydrogen or an aliphatic radical, $R_2$ an aliphatic, araliphatic or aromatic radical, $R_3$ represents halogen, especially chlorine, bromine or iodine, a lower alkyl, alkoxy, alkylthio, alkylsulfinyl or alkylsulfonyl residue or one of the groups—$NO_2$,—CN,—SCN,—CHO,

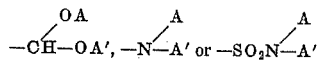

(in which A and A′ are identical or different and each represents hydrogen or lower alkyl and/or represent a carbalkoxy group), $n=0$, 1 or 2, $R_4$ represents hydrogen, an aliphatic or araliphatic radical, $R_5$ represents hydrogen or an aliphatic or aromatic radical and $R_6$ represents hydrogen or an aliphatic radical which may be linked with the nitrogen atom through oxygen, with the proviso that when $R_4$ represents hydrogen, the phenolic and the nitrogenous groups must be in paraposition relatively to each other, together with a suitable carrier. The new preparations may also contain one or more of the following additives: a solvent, a diluent, an emulsifier, a dispersant, a thickener, an adhesive and a fertilizer, and furthermore also other known pesticides.

As mentioned above, the symbols $R_2$, $R_4$ and $R_5$ may be aliphatic, araliphatic or aromatic residues.

The aromatic portion of such residues may be unsubstituted or substituted by the same kind of group as mentioned above for the substituents $R_3$.

Aliphatic residues may be saturated or unsaturated and thus consist, for example, of alkyl, alkenyl, alkinyl residues. They may also be interrupted by one or more oxygen or sulfur atoms and, if desired, contain further substituents such as cyano groups, halogen atoms, hydroxyl or carbalkoxy groups.

When the residues $R_5$ and $R_6$ are of an aliphatic nature, they may form a heterocycle together with the nitrogen atom linked with them so that they represent, for example, a pyrrolidine, piperidine, morpholine, thiomorpholine, piperazine or hexamethylene-imine ring.

The new carbamates of the general formula (I) possess valuable biocidal properties. For example, they act as insecticides, acaricides, against endo- and ectoparasites, for example, helminthes, blood-sucking insects, soil nematodes, phytopathogenic bacteria and fungi and the like. It has also been observed that they have a strong action against blowfly.

The new carbamates are especially advantageous in that, when used in concentrations that ensure reliable results against the pests, the host or the host plant respectively is in no way damaged.

Certain carbamates, especially those in which $R_1$ represents a hydrogen atom and $R_2$ an araliphatic or aromatic radical which may be substituted by halogen and/or alkyl, when used at a high-concentration, also act against undesirable plant growth and as defoliants for culture plants for example, cotton or soybeans.

The new preparations may be applied in a variety of ways. Aqueous sprays may be prepared, for example, on the basis of an emulsifiable concentrate or of a wettable powder. A suitable emulsifiable concentrate may be prepared, for example, from about 25 parts of a compound of the formula (I), 40 to 50 parts of diacetone alcohol or isophorone, 20 to 30 parts of an aromatic petroleum product, xylene, toluene or another mixture of such solvents, and two to 10 parts of one or more emulsifiers. There may be further added a small quantity of an agent that promotes the formation of a homogeneous solution, for example, methanol, methoxymethanol or butoxymethanol.

A suitable emulsifying agent can be prepared, for example, from one to 1.5 parts of the calcium or sodium salt of dodecylbenzenesulfonic acid, 2.5 to four parts of an octyl- or nonylphenoxy-polyethoxyethanol and about 0.5 to one part of methanol and zero to 0.8 part of xylene. The resulting mixture is added to the solvents and the active ingredient of the formula (I) at the ratio mentioned above. It is also possible to use one or more other surface-active agents.

If desired and when suitable, any one of such agents may be used, for example, an anionic or cationic or nonionic emulsifier soluble in solvents. Instead of the above-mentioned nonionic agent derived from an alkylphenol and ethylene oxide, there may be used, for example, an ethylene oxide condensate of a long-chain alcohol, carboxylic acid, phenol or amine. Compounds of all these types are commercially available. Also nonionic condensates of polyglycerols and fatty acids, or polyglycerols and a resin-forming acid for example, phthalic acid, may be used for the manufacture of self-emulsifying preparations. Typical anionic agents are those based on alcohol sulfonates, sulfates or sulfosuccinates. Cationic surface-active agents soluble in solvents are, for example, oleylbenzyldimethylammonium chloride or dodecyl-benzyltrimethylammonium chloride and bromide. It can therefore be seen that the character of the emulsifier used in any individual case is not of special significance provided that it is soluble in the solution of the active substance in one or more inert organic solvents.

A wettable powder may be prepared by taking up an active substance of the formula I in a volatile solvent, for example, in acetone, and mixing it with a finely distributed solid material, for example, kaolin, pyrophillite or diatomaceous earth, while evaporating the solvent. The powder is heated in admixture with a small quantity of one or more wetting and dispersing agents. A typical wettable powder consists, for example, of 20 to 50 parts of an active substance of the formula (I), 77.5 parts of one or more finely dispersed solids, 0.5 part of a wetting agent, for example, an octyl-phenoxy-polyethoxyethanol, and 2 parts of the sodium salt of a condensed naphthalene-formaldehyde sulfonate sodium[methylene-dinaphthalene-disulfonate].

A dusting preparation containing 5 to 10 percent of the active substance may be manufactured by diluting such a wettable powder with a finely dispersed solid vehicle. If desired, the wetting agent may be omitted, and the dispersant may, if desired, likewise be omitted or replaced by others.

As a rule, all the preparations described above contain a vehicle and in most cases, also a surface-active product.

The new carbamates of the general formula (I) may be prepared in the following manner:

An aminophenol of the formula

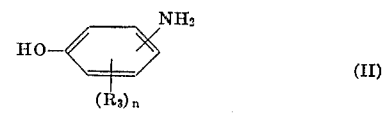

is reacted with an isothiocyanate of the formula
$$S=C=N-R_5 \text{ or}-R_6 \quad (III)$$
or with a corresponding thiocarbamylhalide of the formula

and the resulting thiourea of the formula

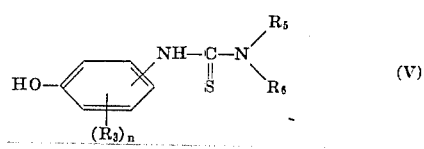

which, if desired, may be alkylated or aralkylated on the sulfur atom, and the group

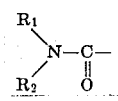

is introduced into the phenol residue with the aid of a suitable isocyanate or carbamylhalide.

According to an alternative variant, a chlorocarbonate of the formula

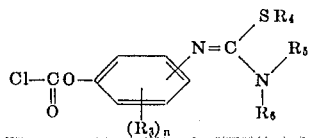

in which $R_3$, $R_5$ and $R_6$ have the above meanings and $R_4$ represents an alkyl or aralkyl radical—is manufactured in known manner and further reacted with an amine of the formula

if desired, in the presence of a hydrogen halide acceptor.

The alkylation or aralkylation on the sulfur, that is to say the conversion of a thiourea into an S-alkyl- or S-aralkyl-isothiourea, may be carried out with the aid of a reactive ester of an alkanol or aralkanol. As reactive esters, it is preferable to use the hydrohalic esters, that is to say the chloride, bromides or iodides, or the esters of sulfonic acids, for example, the mesylates or tosylates, or the esters of sulfuric acid, that is to say the dialkylsulfates.

The introduction of the group (VI) into the phenolic groups of the thiourea of the formula (V) is carried out in known manner, for example, with a corresponding isocyanate or carbamylhalide in the presence of a tertiary base, for example, triethylamine or triethylenediamine.

The resulting active substances of the formula (I) may also be isolated and applied in the form of their salts with inorganic or organic acids.

The salts may be formed, for example, with the following acids: sulfuric, sulfamic, boric, hydrochloric, hydrobromic, acetic, citric, maleic or phthalic acid.

The active substances of the formula (I) are new. Accordingly, the present invention includes also the new compounds of the formula (I).

The following examples illustrate the invention:

EXAMPLE 1 a. One hundred-nine grams of p-aminophenol in 300 ml. of alcohol are refluxed for 2 hours with 73 g. of methylisothiocyanate. About ½ liter of water is added and the mixture cooled and N-p-hydroxyphenyl-N'-methylthiourea is precipitated.
Yield: 137 g. Melting point: 189°–191° C.

b. One hundred-five grams of this thiourea in 300 ml. of acetonitrile are mixed with 40 g. of methylisocyanate and 0.5 g. of triethylenediamine and the mixture stirred for 5 hours at 40° C. Then about 200 ml. of acetonitrile are distilled off, about 200 ml. of benzene are added and the mixture is allowed to cool, to furnish 123.9 g. of crystalline (O-methylcarbamoyl)-(N-methylthiocarbamoyl)-p-aminophenol, melting at 162°–163° C.

c. 93.9 grams of this product in 300 ml. of acetone are mixed with 40.5 ml. of dimethyl sulfate and refluxed for 5 hours, then allowed to cool, the precipitate is suctioned off and washed with ether, to yield 127 g. of the product of the formula

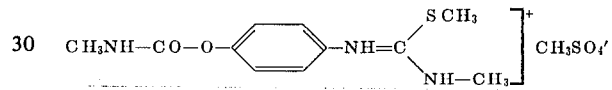

which melts at 162° C., with decomposition.

d. In order to isolate the free base,

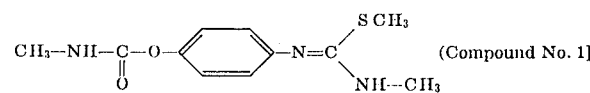   (Compound No. 1)

77 g. of the salt are stirred in about 300 ml. of ice water and the solution is rendered alkaline with calciumcarbonate, filtered, washed neutral with water and dried. Yield: 49 g. Melting point: 164°–166° C. (from acetonitrile).

In a similar manner, the following compounds may be prepared:

| No. | Compound | M.P., ° C. |
|---|---|---|
| (2) | CH₃NH—C(=O)—O—⟨C₆H₄⟩—NH—CS—NH—⟨C₆H₅⟩ | ¹ 152 |
| (3) | CH₃—NH—C(=O)—O—⟨C₆H₄⟩—N=C(SCH₃)—NH—⟨C₆H₅⟩ | 126–128 |
| (4) | CH₃—NH—C(=O)—O—⟨C₆H₄⟩—NH—C(=S)—N(CH₃)₂ | 168–170 |
| (5) | CH₃—NH—C(=O)—O—⟨C₆H₃(CH₃)⟩—N=C(SCH₃)—N(CH₃)₂ | Oil |
| (6) | Cl—⟨C₆H₃(Cl)⟩—NH—C(=O)—O—⟨C₆H₄⟩—N=C(SCH₃)—N(CH₃)₂ | |

| No. | Compound | M.P., °C. |
|---|---|---|
| (7) | ![phenyl-NH-C(=O)-O-phenyl-N=C(SCH3)-N(CH3)2] | |
| (8) | ![3,5-bis(CF3)-phenyl-NH-CO-O-phenyl-N=C(SC2H5)-NH2] | |
| (9) | ![4-Cl-3-CF3-phenyl-NH-CO-O-phenyl-N=C(SCH3)-NH-CH3] | |
| (10) | ![3,5-bis(CF3)-phenyl-NH-CO-O-phenyl-N=C(S-CH2-C6H4-Cl)-NH2] | |
| (11) | ![4-Cl-phenyl-NH-CO-O-phenyl-N=C(SCH3)-N(CH3)2] | |
| (12) | ![(CH3)2N-CO-O-phenyl-N=C(SCH3)-N(CH3)2] | |
| (13) | ![CH3-NH-CO-O-(2-CH3-phenyl)-N=C(SCH3)-NH2] | |
| (14) | ![CH3-NH-CO-O-(2-CH3-phenyl)-N=C(SCH3)-NH-CH3] · CH3-OSO3H | 163–165 |
| (15) | ![CH3-NH-CO-O-(2-CH3-phenyl)-N=C(SCH3)-NH-(4-Cl-2-CH3-phenyl)] | |
| (16) | ![CH3-NH-CO-O-(2-CH3-phenyl)-NH-CS-NH-(4-Cl-2-CH3-phenyl)] | |
| (17) | ![(CH3)2N-CO-O-phenyl-N=C(SCH3)-NH2] | |
| (18) | ![CH3-NH-CO-O-phenyl-N=C(SCH3)-NH2] | |
| (19) | ![CH3-NH-CO-O-phenyl-N=C(SCH3)-NH-CH3] | 104 |
| (20) | ![(CH3)2N-CO-O-phenyl-N=C(SC2H5)-NH-CH3] | |

| No. | Compound | M.P., °C. |
|---|---|---|
| (21) | CH₃-N(O)(CH₃)-C(=N-)-O-C₆H₄-N=C(NH₂)-S-CH₂-C₆H₅ | |
| (22) | [3,4-Cl₂-C₆H₃-NH-C(O)-O-C₆H₄-N(H)=C(SCH₃)-NH-CH₃]⁺ CH₃SO₄⁻ | [1] 174 |
| (23) | 3,4-Cl₂-C₆H₃-NH-C(O)-O-C₆H₄-NH-CS-NH-CH₃ | [1] 165 |
| (24) | C₆H₅-NH-C(O)-O-C₆H₄-NH-CS-NH-CH₃ | [1] 138–140 |
| (25) | CH₃-NH-CO-O-C₆H₄-NH-CS-NH₂ | [1] 185–186 |
| (26) | CH₃-NH-CO-O-C₆H₄-N=C(SCH₃)(CH(CH₃)₂) | 76–78 |
| (27) | CH₃-NH-CO-O-C₆H₄-N=C(S-C₂H₅)-N(CH₃)₂ | Oil |
| (28) | CH₃-NH-CO-O-(3-CH₃-C₆H₃)-NH-CS-NH-CH₃ | [1] 136 |
| (29) | C₆H₅-NH-CO-O-(3-CH₃-C₆H₃)-NH-CS-NH-CH₃ | [1] 135 |
| (30) | 3,4-Cl₂-C₆H₃-NH-CO-O-(3-CH₃-C₆H₃)-NH-CS-NH-CH₃ | [1] 154–156 |
| (31) | CH₃-NH-CO-O-(3-CH₃-C₆H₃)-N=C(SCH₃)-NH-CH₃ | 137–139 |
| (32) | C₆H₅-NH-CO-O-(3-CH₃-C₆H₃)-N=C(SCH₃)-NH-CH₃ | 148–149 |
| (33) | 3,4-Cl₂-C₆H₃-NH-CO-O-(3-CH₃-C₆H₃)-N=C(SCH₃)-NH-CH₃ | 167–169 |
| (34) | CH₃-NH-CO-O-(2-CH₃-C₆H₃)-NH-CS-N(CH₃)₂ | 149–150 |
| (35) | CH₃-NH-CO-O-(3-CH₃-C₆H₃)-NH-CS-N(CH₃)₂ | 175–176 |

| No. | Compound | M.P., °C |
|---|---|---|
| (36) | [structure: CH3-NH-CO-O-phenyl(with CH3, N=C(SCH3)-N(CH3)2, CH3)] | Oil |
| (37) | [structure: (CH3)2N-CO-O-phenyl-N=C(SCH3)-N(CH3)2] | |
| (38) | [structure: (CH3)2N-C(=O)-O-phenyl-N=C(SCH3)-N(CH3)2] | |
| (39) | [structure: (CH3)2N-C(=O)-O-phenyl-N=C(SC2H5)-N(CH3)2] | |
| (40) | [structure: (CH3)2N-C(=O)-O-phenyl-N=C(SCH3)-NH-CH3] | |

[1] Decomp.

EXAMPLE 2

A wettable powder of 50 percent strength is prepared from compound No. 1 in the following manner:

Five hundred grams of active substance, 400 g. of bolus alba, 50 g. of finely precipitated silica (commercially available under the Registered Trademark HISIL) and 25 g. of a condensation product of 1 mol of p-tertiary octylphenol with about 8 mole of ethylene oxide as emulsifier, and 25 g. of sodium 1-benzyl-2heptadecyl-benzimidazole-disulfonate as dispersant, are ground in a rod mill to form an extremely fine powder. The resulting wettable powder gives a stable dispersion with water in any desired concentration. The powder may also be used as a dusting preparation.

EXAMPLE 3

An acetonic solution of active substance No. 5 was used as a spray for soil treatment. When the solvent had evaporated, various pests were exposed to the action of the residue, that is to say the active substance. After 24 hours' exposure, the following results were recorded:

TABLE I

| Pest | minimal inhibitory concentration to achieve 100 percent destruction mg./m.$^2$ |
|---|---|
| Phyllodromia germanica | 12 |
| Periplaneta americana | 6 |
| Blatta orientalis | 12 |
| Tenebrio molitor | 100 |
| Dermestes frischii (Imago) | 200 |
| Dermestes frischii (Larve) | 25 |
| Acheta domestica | 12 |

Similar results were obtained with the compounds Nos. 1, 19, 26, 27 and 34.

EXAMPLE 4

Compounds Nos. 24 and 29 proved to be efficient herbicides.

EXAMPLE 5

Phytopathogenic fungi (for example, Alternaria) were efficiently controlled, for example, with compounds Nos. 3, 24, 27 and 30.

We claim:

1. The carbamate of the formula,

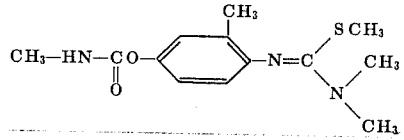

2. A carbamate of the formula

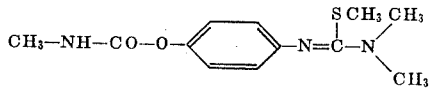

* * * * *